(12) United States Patent
Whitaker

(10) Patent No.: US 8,649,501 B1
(45) Date of Patent: Feb. 11, 2014

(54) INTERACTIVE DIALING SYSTEM

(71) Applicant: Convergent Resources Holdings, LLC, Atlanta, GA (US)

(72) Inventor: Derek Whitaker, Renton, WA (US)

(73) Assignee: Convergent Resources Holdings, LLC, Atlanta, GA (US)

( * ) Notice: Subject to any disclaimer, the term of this patent is extended or adjusted under 35 U.S.C. 154(b) by 0 days.

(21) Appl. No.: 13/729,143

(22) Filed: Dec. 28, 2012

(51) Int. Cl.
H04M 3/42 (2006.01)
H04M 3/50 (2006.01)
H04M 3/523 (2006.01)

(52) U.S. Cl.
USPC ............ 379/266.07; 379/266.08; 379/265.11; 379/265.12

(58) Field of Classification Search
CPC ... H04M 3/5233; H04M 3/5232; H04M 3/51; H04M 3/523; H04M 3/5175; H04M 2203/402
USPC .............. 379/266.08, 265.11–265.13, 266.07
See application file for complete search history.

(56) References Cited

U.S. PATENT DOCUMENTS

| 5,430,792 | A |  | 7/1995 | Jesurum et al. |
| 5,463,685 | A |  | 10/1995 | Gaechter et al. |
| 5,465,286 | A | * | 11/1995 | Clare et al. ................. 379/32.04 |
| 5,533,103 | A |  | 7/1996 | Peavey et al. |
| 5,553,133 | A |  | 9/1996 | Perkins |
| 5,561,711 | A |  | 10/1996 | Muller |
| 5,590,188 | A |  | 12/1996 | Crockett |
| 5,638,436 | A |  | 6/1997 | Hamilton et al. |
| 5,687,225 | A |  | 11/1997 | Jorgensen |
| 5,696,811 | A |  | 12/1997 | Maloney et al. |
| 5,724,420 | A |  | 3/1998 | Torgrim |
| 5,742,675 | A |  | 4/1998 | Kilander et al. |
| 5,799,077 | A |  | 8/1998 | Yoshii |
| 5,822,400 | A |  | 10/1998 | Smith |
| 5,825,869 | A |  | 10/1998 | Brooks et al. |
| 5,854,825 | A |  | 12/1998 | Mukaihara et al. |
| 5,907,601 | A |  | 5/1999 | David et al. |
| 5,926,528 | A |  | 7/1999 | David |
| 6,169,798 | B1 |  | 1/2001 | Ishikawa |
| 6,278,776 | B1 |  | 8/2001 | Mark et al. |
| 6,278,777 | B1 |  | 8/2001 | Morley et al. |
| 6,321,194 | B1 |  | 11/2001 | Berestesky |
| 6,366,667 | B1 | * | 4/2002 | Palacios et al. .......... 379/266.02 |
| 6,377,944 | B1 |  | 4/2002 | Busey et al. |
| 6,463,148 | B1 |  | 10/2002 | Brady |
| 6,466,664 | B1 |  | 10/2002 | Zhao |
| 6,600,822 | B2 |  | 7/2003 | Kamen |
| 6,658,106 | B1 |  | 12/2003 | Atkinson et al. |
| 6,707,906 | B1 |  | 3/2004 | Ben-Chanoch |
| 6,751,310 | B1 | * | 6/2004 | Crossley ................... 379/266.07 |
| 6,804,346 | B1 |  | 10/2004 | Mewhinney |

(Continued)

FOREIGN PATENT DOCUMENTS

| EP | 1134960 A2 | 9/2001 |
| EP | 1865697 A2 | 12/2007 |
| KR | 2001-0070498 A | 7/2001 |

Primary Examiner — Harry S Hong
(74) Attorney, Agent, or Firm — K&L Gates LLP

(57) ABSTRACT

The present disclosure is directed to systems and methods for processing an outbound call to a target. The methods and systems of the present disclosure may provide an interface between a human controller and an automated dialing system to prompt the human controller for permission to place the outbound telephone call to the target.

13 Claims, 2 Drawing Sheets

(56) References Cited

U.S. PATENT DOCUMENTS

| | | |
|---|---|---|
| 6,928,157 B2 | 8/2005 | Price |
| 7,023,979 B1 | 4/2006 | Wu et al. |
| 7,110,525 B1 | 9/2006 | Heller et al. |
| 7,142,662 B2 | 11/2006 | Rodenbusch et al. |
| 7,158,630 B2 | 1/2007 | Fotta et al. |
| 7,555,114 B1 * | 6/2009 | Stahr ................ 379/265.01 |
| 7,606,718 B2 | 10/2009 | Cloran |
| 7,616,755 B2 | 11/2009 | Whitman, Jr. |
| 7,689,426 B2 | 3/2010 | Matula |
| 7,734,029 B2 | 6/2010 | Ryskamp |
| 7,817,796 B1 * | 10/2010 | Clippinger et al. ...... 379/266.07 |
| 7,995,742 B2 | 8/2011 | Lenard |
| 8,036,374 B2 | 10/2011 | Noble, Jr. |
| 8,233,609 B2 | 7/2012 | Noble, Jr. |
| 2004/0037397 A1 * | 2/2004 | Roby ..................... 379/88.01 |
| 2006/0036487 A1 | 2/2006 | Mann |
| 2012/0099720 A1 | 4/2012 | Soundar |
| 2013/0208883 A1 * | 8/2013 | Christensen et al. .... 379/266.07 |

* cited by examiner

INTERACTIVE DIALING SYSTEM

BACKGROUND

Automated dialing systems are broadly used in multiple industries such as telemarketing. Typically, when an originator, such as a telemarketing firm, contacts a target such as a consumer via telephone, the originator utilizes an automated dialing system that is configured to select the target's phone number from a list of telephone numbers for multiple targets. When the target answers the telephone, the automated dialing system routes the call to an agent of the originator.

Certain regulations prohibit the use of fully automated dialing systems in communications with certain targets. The present disclosure may provide a solution in a system which includes an automated component and a human component.

SUMMARY

In one general aspect, the present disclosure is directed to systems and methods for processing an outbound telephone call from a call originator to a call target. The methods and systems of the present disclosure may provide an automated dialing system, and an interface between a human controller and the automated dialing system. The dialing system may be configured to prompt the human controller through the interface for permission to place the outbound telephone call to the target. These and other aspects of the present disclosure are described below.

FIGURES

Figure 1:
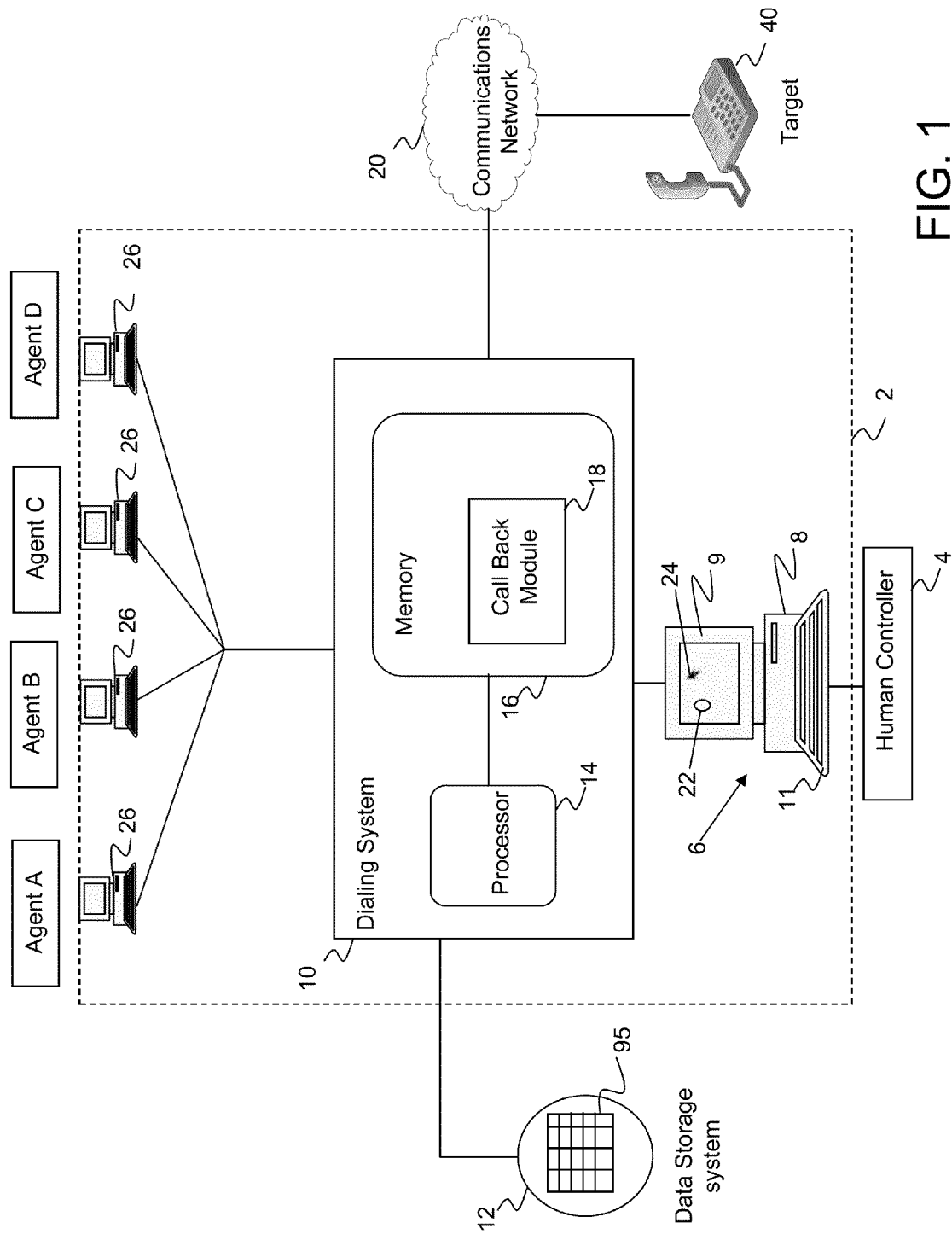
Figure 2:
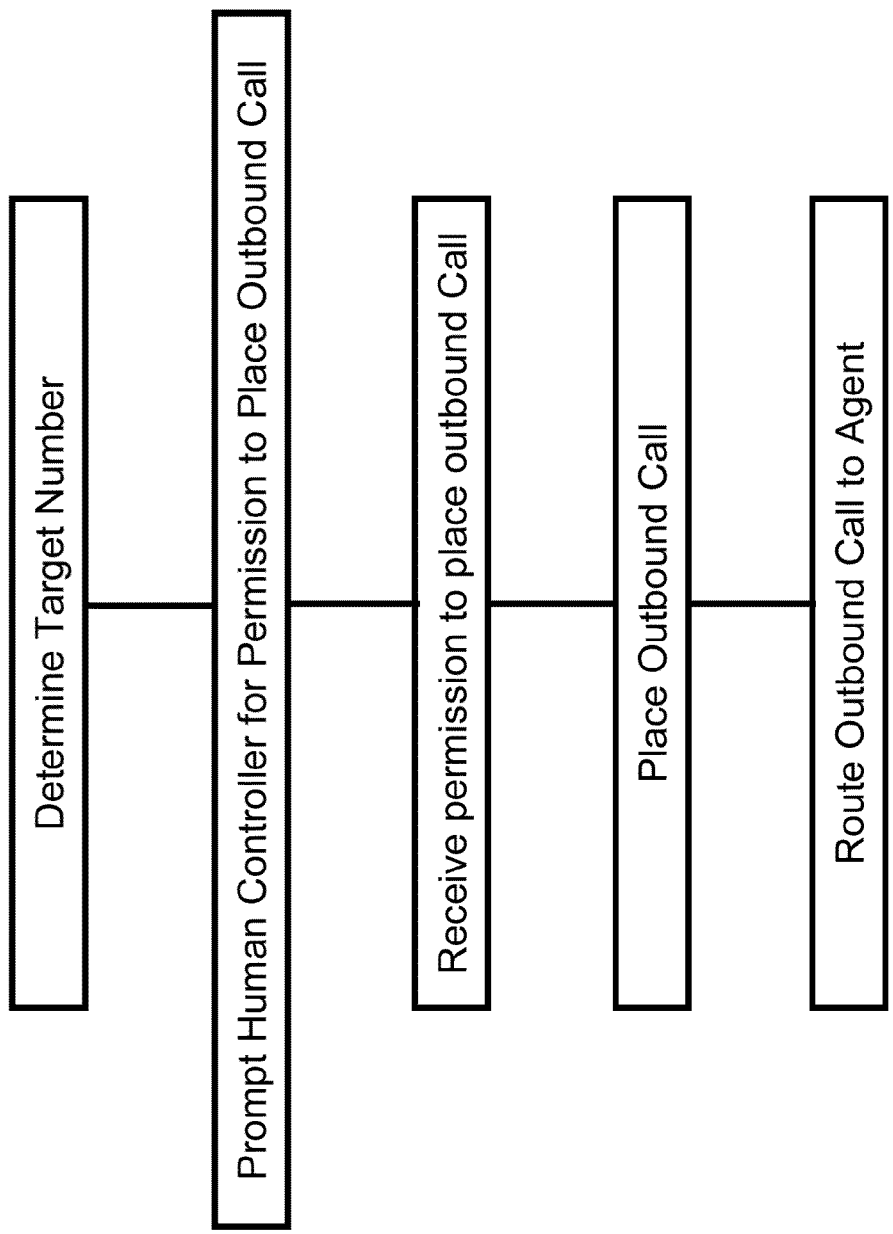

Various embodiments of the present invention are described herein by way of example in conjunction with the following figures, wherein:

FIG. 1 is block diagram of a system according to various embodiments of the present disclosure; and FIG. 2 is a flow chart of a process according to various embodiments of the present disclosure.

DESCRIPTION

Various embodiments of computer-based systems and methods of the present invention are described below. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims.

FIG. 1 is a diagram, according to various embodiments of the present disclosure, of a system 2 which includes a computer-based dialing system 10, and a pacing engine computer system 6 that can be in communication with the dialing system 10 and used by a human controller 4. The computer-based dialing system 10 may be in communication with a computer-based data storage system 12 and a communications network 20 (e.g., a telephone network, such as a PSTN and/or a VOIP network). The computer based dialing system 10 may a computerized, programmable, automated dialing system that places telephone calls from a call originator via the communications network 20 to targets 40. For example, originator may be a call center, a person, and/or an organization, and targets 40 may be various consumers. As shown in FIG. 1, the system 10 may comprise one or more processor circuits 14, and one or more memory units 16. For convenience, only one processor circuit (referred to hereinafter simply as "processor") 14 and one memory unit 16 are shown in FIG. 1, although it should be recognized that the computer system 10 may comprise multiple processors and/or multiple memory units 16. The memory 16 may store a number of software modules, such as callback module 18, as shown in FIG. 1. The modules such as module 18 may comprise software code that is executed by the processor 14, which execution causes the processor 14 to perform various actions dictated by the software code of the various modules, as explained further below. The processor 14 may have one or multiple cores. The memory 16 may comprise primary computer memory, such as a read only memory (ROM) and/or a random access memory (e.g., a RAM). The memory could also comprise secondary computer memory, such as magnetic or optical disk drives or flash memory, for example.

The data storage system 12 may comprise a number of data stores, which may be implemented as computer databases, data files, directories, or any other suitable system for storing data for use by computers. The data storage system 12 may be embodied as solid state memory (e.g., ROM), hard disk drive systems, RAID, disk arrays, storage area networks (SANs), and/or any other suitable system for storing computer data. In addition, the data storage system 12 may comprise caches, including web caches and database caches.

Referring again to FIG. 1, the pacing engine computer system 6 can be in operable communication with dialing system 10, for example via a TCP/IP network (not shown). Dialing system 10 may prompt the human controller 4 through the interface provided by the pacing engine computer system 6 for permission to place an outbound call to a target 40. In addition, human controller 4 may provide his permission to dialing system 10 through the interface provided by the pacing engine computer system 6. Furthermore, in response to receiving the permission from the human controller 4, dialing system 10 may place the outbound call to the target 40 via the communications network 20.

In various embodiments, as illustrated in FIG. 1, the data storage system 12 may store a table 95 that includes a list of telephone numbers for multiple targets 40, wherein each telephone number corresponds to one of the targets. The module 18 of system 10 may include software code, which may be executed by the processor 14, for accessing the table 95 in data storage system 12 to select a destination number for one of the multiple targets 40 from the list of telephone numbers in table 95. In addition, module 18 may also include software code, which may be executed by the processor 14 to prompt the human controller 4 through the interface provided by pacing engine computer system 6 for permission to place the outbound call to target 40 using the selected destination number for target 40. Furthermore, module 18 may also include software code, which may be executed by the processor 14 to receive such permission from the human controller 4 through the interface provided by the pacing engine computer system 6, and upon receiving such permission to place the outbound call to target 40 via the communications network 20 using the selected destination number. In the event a live line of communication is established with target 40, module 18 may also include software code, which may be executed by the processor 14 to route the outbound call to one of agents A-D, as illustrated in FIG. 1.

In various embodiments, as illustrated in FIG. 1, the pacing engine computer system 6 may comprise a computer terminal 8, which may include a visual display 9 and an input 11. In various embodiments, input 11 may include, for example, a touch screen, a computer keyboard, and/or a computer mouse. As described above, the human controller 4 may be prompted through the interface provided by pacing engine computer system 6 for permission to place the outbound call to target 40. In at least one embodiment, such prompting can be achieved by showing and/or activating a visual stimulus on display 9 such as, for example, an icon or an image. In various embodiments, the visual stimulus can comprise an icon 22, as illustrated in FIG. 1, which can begin to glow to alert human controller 4 that his permission is needed to place the outbound call to target 40. Furthermore, an auditory stimulus such as, for example, a ringing sound or other suitable sounds, can be used alone or in combination with the visual stimulus to prompt the human controller 4 for permission to place the outbound call to target 40.

The human controller 4, in response to the prompt from the dialing system 10, may give permission to place the outbound call via the interface by utilizing the input 11 of pacing engine computer system 6. Dialing system 10 may be configured to receive such permission from the pacing engine computer system 6, and in response, place the outbound call to target 40. In the example described above, human controller 4 may give his permission by using the computer mouse of input 11 to click the glowing icon 22 via a cursor 24, as illustrated in FIG. 1. In addition, dialing system 10 may be configured to recognize the clicking of the glowing icon 22 by the human controller 4 as an indication that human controller 4 approves the placement of the outbound call to target 40. Other means for prompting the human controller 4 for permission to place the outbound call to target 40 and responding to the prompt are contemplated within the scope of the present disclosure.

In the example described above, dialing system 10 may be configured to stop icon 22 from glowing once the icon 22 is clicked by human controller 4, which may give a visual confirmation to human controller 4 that his permission was received by the dialing system 10. In addition, stopping icon 22 from glowing may reset the interface for the next prompt.

As described above, upon receiving the permission from the human controller 4, agent pacing computer system 6 may be configured to place the outbound call to target 40 via the communications network 20 and route the outbound call to an agent. To call a second target 40, dialing system 10 may then access data storage system 12 again to select a new destination number for another target 40 from the list of telephone numbers in table 95. Similar to the above, human controller 4 may then be prompted again for permission to place an outbound call using the newly selected destination number. The process can then be repeated as desired.

In various embodiments, as described above, dialing system 10 can be configured to obtain permission from human controller 4 to place the outbound call to target 40. In certain embodiment, such task can be accomplished through an interactive game to maintain the attention of human controller 4 while processing the outbound calls to targets 40. In at least one embodiment, the object of the game may be to chase and stop a randomly moving image or icon.

For example, dialing system 10 can be configured to begin to randomly move an icon such as, for example, icon 22 on display 9 to alert the human controller 4 that his permission is needed to place an outbound call. An accompanying sound can also be used to secure the attention of human controller 4. In response, the human controller 4 can use the computer mouse of input 11 to give his permission to place the outbound call to target 40, by chasing and clicking on the moving icon 22 via cursor 24. As described above, dialing system 10 can be configured to recognize the clicking on the icon 22 as an indication that human controller 4 approves the placement of the outbound call to target 40.

Furthermore, dialing system 10 may be configured to stop icon 22 from moving once the icon 22 is clicked by human controller 4, which may signal the completion of the game, and may give a visual confirmation to human controller 4 that his permission was received by the dialing system 10. In addition, stopping icon 22 from moving may reset the interface for the next prompt. Other game types or articles, which can be utilized in obtaining permission from human controller 4 to place the outbound call to target 40, are contemplated within the scope of the present disclosure and are incorporated herein by reference.

As described above, upon receiving permission from human controller 4 through the interface provided by pacing engine computer system 6, the outbound call to target 40 can then be placed via communications network 20. In various embodiments, communications network 20 can be provided by one or more carriers. In various embodiments, communications network 20 may include a voice communications network such as VoIP or a public switch telephone network or combinations thereof.

FIG. 2 shows a process flow, according to an aspect of this disclosure, for placing an outbound call to a target utilizing a system such as system 2. The process may include storing, in a computer database such as that of storage system 12, a plurality telephone numbers for multiple targets 40, and selecting one of the plurality of telephone numbers to use in placing the outbound call to the target 40. The process may further include prompting human controller 4 for permission to place the outbound call, receiving the permission, and in response, placing the outbound call to the target 40 using the selected telephone number. In addition, the process may further include routing the outbound call to an agent.

In various embodiments, as described above, dialing system 10 can be configured to route the outbound call to a selected agent, if a live line of communication is successfully established with target 40. As illustrated in FIG. 1, system 2 may include a call agent computer system 26, wherein dialing system 10 may be configured to route the outbound call to the selected agent through the interface provided by the call agent computer system 26. In addition, dialing system 10 may be configured to present information about target 40 to the selected agent through the interface provided by the call agent computer system 26. In various embodiments, the system 10 and the interface 26 may be in communication via a TCP/IP network (not shown), for example.

Referring again to FIG. 1, dialing system 10 may be configured to prompt the human controller 4 through the interface provided by pacing engine computer system 6 to select an agent, for example one of agents A-D, for the outbound call to target 40. In addition, dialing system 10 may be configured to present information through the interface provided by the pacing engine computer system 6 to human controller 4 to aid the human controller 4 in the selection process.

For example, human controller 4 may receive, through the interface provided by the pacing engine computer system 6, information about the availability of agents A-D to take the outbound call. In certain embodiments, human controller 4 may receive statistical data about the efficiency of the agents A-D. In various embodiments, each one of agents A-D may be represented on display 9 by an icon, which may display the agent's name and/or identification number. To select Agent A, for example, human controller 4 may click the icon representing Agent A. Dialing system 10 may be configured to route the outbound call through the second interface 26 to Agent A in compliance with the choice of the human controller 4.

It will be apparent to one of ordinary skill in the art that at least some of the embodiments described herein may be implemented in many different embodiments of software, firmware, and/or hardware. The software and firmware code may be executed by a processor circuit or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for placing an outbound call to a target, the system comprising:
   a computer database that stores data comprising a plurality of telephone numbers for multiple targets, wherein each of the plurality of telephone numbers is associated with one of the multiple targets; and
   a computerized, programmable, automated dialing system in communication with the computer database and in communication with a communications network, wherein the dialing system is programmed to:
   access the database and select one of the plurality of telephone numbers for one of the multiple targets;
   visually display for a human controller at a pacing engine computer system a first interface that prompts the human controller through the first interface to obtain permission to place an outbound call to the target;
   receive via the first interface permission from the human controller to place the outbound call to the target; and
   in response to receiving the permission from the human controller, place the outbound call to the target via the communications network using the selected one of the plurality of telephone numbers.

2. The system of claim 1, wherein the dialing system is further programmed to present information through the first interface to the human controller to facilitate selecting a call center agent for the outbound call.

3. The system of claim 2, wherein the dialing system is programmed to receive an identifier for the selected call center agent through the first interface.

4. The system of claim 2, wherein the dialing system is programmed to route the outbound call through a second interface at a call agent computer system to the selected call center agent.

5. The system of claim 4, wherein the dialing system is programmed to present information about the target through the second interface to the selected call center agent.

6. The system of claim 1, wherein the communications network comprises a telephone network.

7. The system of claim 5, wherein the telephone network comprises a VoIP telephone network.

8. The system of claim 1, wherein the dialing system is programmed to present a game through the first interface to the human controller, and wherein an object of the game includes obtaining the permission from the human controller to place the outbound call to the target.

9. A computer-implemented method for placing an outbound call to a target, the method comprising the steps of:
- storing, in a computer database, a plurality telephone numbers for multiple targets, wherein each of the plurality of telephone numbers is associated with one of the multiple targets;
- selecting by a computerized, programmable, automated dialing system that is in communication with the computer database one of the plurality of telephone numbers to use in placing the outbound call to the target;
- prompting through a pacing engine computer system that is in communication with the computerized, programmable, automated dialing system a human controller for permission to place the outbound call;
- receiving through the pacing engine computer system permission from the human controller to place the outbound call to the target; and
- in response to receiving the permission from the human controller, placing the outbound call by the computerized, programmable, automated dialing system to the target using the selected one of the plurality of telephone numbers.

10. The method of claim 9 further comprising routing the outbound call to a call center agent.

11. The method of claim 9, wherein the automated dialing system is in communication with a communications network configured to place the outbound call.

12. The method of claim 11, wherein the communications network comprises a telephone network.

13. The method of claim 12, wherein the telephone network comprises a VoIP network.

* * * * *